United States Patent [19]

Harwath

[11] Patent Number: 4,898,523
[45] Date of Patent: Feb. 6, 1990

[54] GEAR PUMP WITH RING-TYPE SHAFT RETAINER

[75] Inventor: Frank L. Harwath, Rockford, Ill.

[73] Assignee: Suntec Industries Incorporated, Rockford, Ill.

[21] Appl. No.: 289,741

[22] Filed: Dec. 27, 1988

[51] Int. Cl.⁴ .......................... F01L 1/10; F16D 1/06
[52] U.S. Cl. ..................................... 418/70; 418/170; 403/326
[58] Field of Search .............. 403/326, 345, 355, 356; 464/30; 418/70

[56] References Cited

U.S. PATENT DOCUMENTS

| | | | |
|---|---|---|---|
| 3,865,499 | 2/1975 | Flichy | 403/226 |
| 4,171,939 | 10/1979 | Harwath . | |
| 4,222,246 | 9/1980 | Rongley | 464/30 |
| 4,391,580 | 7/1983 | Hunsberger et al. . | |
| 4,685,871 | 8/1987 | Harwath . | |

Primary Examiner—Leonard E. Smith
Assistant Examiner—John A. Savio, III
Attorney, Agent, or Firm—Leydig, Voit & Mayer, Ltd.

[57] ABSTRACT

A gear pump in which a drive shaft is telescoped into a bore in a spur gear and is held against rotation relative to the gear by means of a key fitting into keyways formed in the shaft and in the bore of the gear. To retain the shaft against axial movement relative to the gear, a spring steel ring is formed with a radially extending slot having a transverse width just slightly greater than the transverse width of the key. The ring is collapsed hoopwise into a groove in the shaft and is positioned such that the slot in the ring is alined axially with the keyway in the shaft. When the shaft is telescoped to a predetermined depth in the bore in the gear, the ring expands hoopwise and snaps into a groove formed in the wall of the bore. The coaction of the ring with the two grooves locks the shaft against axial movement relative to the gear.

4 Claims, 1 Drawing Sheet

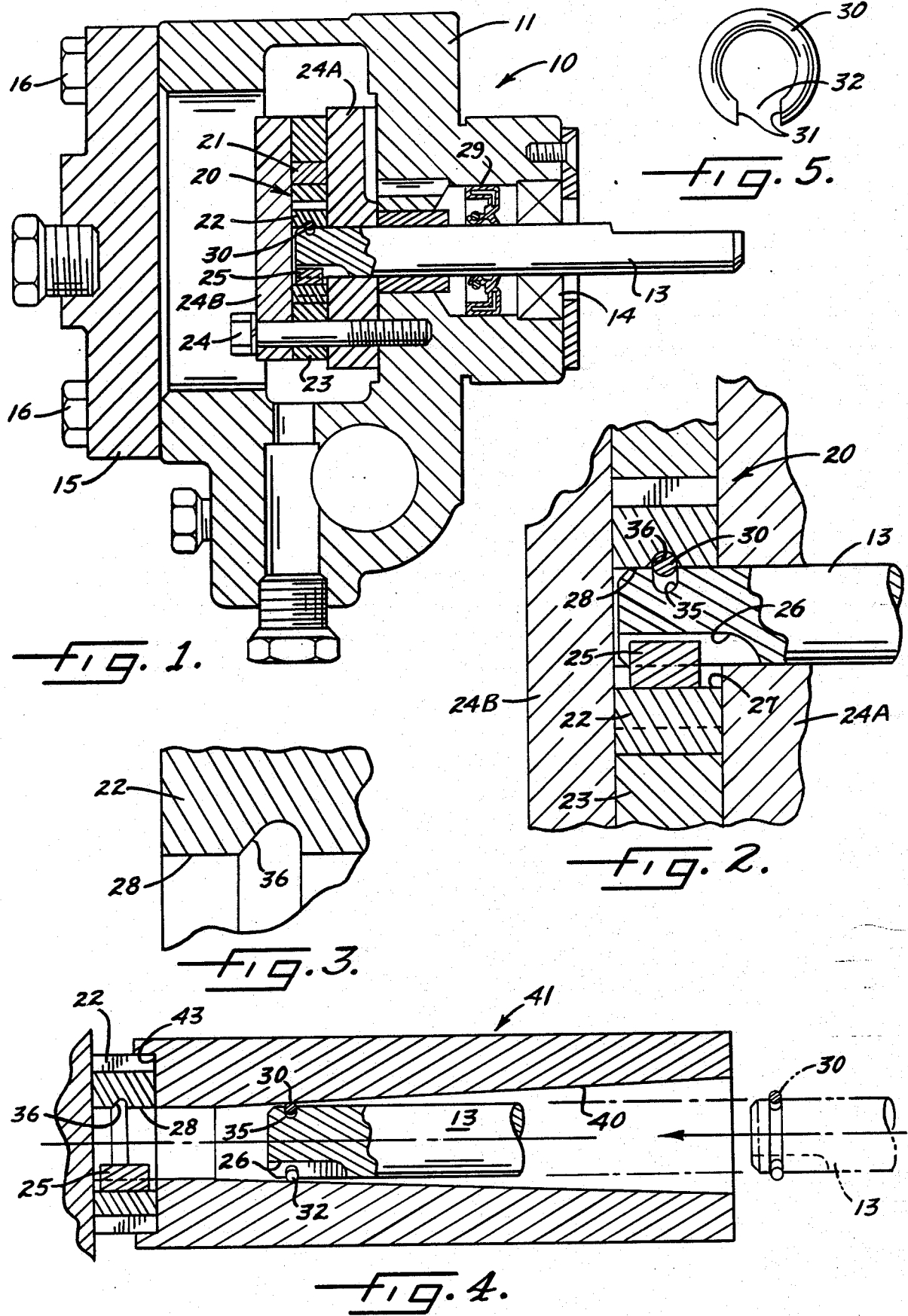

GEAR PUMP WITH RING-TYPE SHAFT RETAINER

BACKGROUND OF THE INVENTION

This invention relates to a gear pump and, more particularly, to a gear pump which is especially designed to supply pressurized liquid fuel to an oil burner. Gear pumps of this general type are disclosed in Harwath U.S. Pat. No. 4,171,939; Hunsberger et al U.S. Pat. No. 4,395,580 and Harwath U.S. Pat. No. 4,685,871.

In a gear pump, it is conventional for a spur gear to be secured by a key to the free end portion of a rotatable drive shaft. The key fits into radially opening slots or keyways in the gear and the shaft and couples the gear and the shaft for rotation in unison. The keyway in the shaft opens axially out of the free end of the shaft to enable the shaft to be assembled with the gear and the key by telescoping the shaft axially into a hole in the gear.

Most conventional gear pumps with a key/slot drive of the type described above are equipped with a so-called face seal for establishing a liquid-tight seal between the shaft and the body of the pump. By its very nature, a face seal prevents relative axial movement between the shaft and the pump body and thus the face seal serves to hold the shaft and the gear in axially assembled relation.

Other gear pumps are provided with a so-called lip seal between the shaft and the pump body. Depending on the pressure, temperature or other characteristics of the particular liquid being pumped, lip seals are sometimes preferred over face seals. A lip seal, however, is not capable of preventing axial movement of the shaft and thus some other means must be used to hold the shaft and the gear in axially assembled relation.

SUMMARY OF THE INVENTION

The general aim of the present invention is to provide a gear pump having a conventional key/slot drive between the shaft and the gear and having relatively low cost and easy-to-assemble means for holding the shaft and the gear in axially assembled relation.

A more detailed object is to achieve the foregoing by using a split retainer ring capable of accommodating the drive key and capable of holding the shaft and the gear in axially assembled relation, the ring automatically snapping into a fully installed position when the shaft is telescoped into the gear.

The invention also resides in the unique dimensional relationship between (a) the ring and the key and (b) the ring and coacting grooves in the shaft and the gear in order to enable the shaft to be assembled easily but securely with the gear.

Still another object is to shape one of the grooves in such a manner as to enable disassembly of the gear and the shaft without risk of damage to those components.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken axially through a gear pump equipped with new and improved shaft retaining means incorporating the unique features of the present invention.

FIG. 2 is an enlarged view of the shaft and the gear shown in FIG. 1.

FIG. 3 is a greatly enlarged view of the groove in the gear.

FIG. 4 is a view showing the shaft being assembled with the gear.

FIG. 5 is a front elevational view of the retaining ring.

DETAILED DESCRIPTION OF THE PREFERRED EMBODIMENT

For purposes of illustration, the invention has been shown in the drawings as embodied in a gear pump 10 of the type which is widely used for delivering fuel oil from a tank (not shown) and supplying the fuel under pressure to an oil burner (not shown). The constructional and operational features of the pump from a hydraulic standpoint are substantially identical to those of the pump disclosed in Hunsberger et al U.S. Pat. No. 4,391,580 to which reference is made for a detailed explanation of the hydraulic structure and operation of the pump.

Briefly, the pump 10 includes a body 11 in the form of a casting. A drive shaft 13 extends through the body and is rotatably supported by a bearing 14 in the body. The outer end portion of the shaft projects outwardly from the outer end of the body. Disposed in face-to-face relation with the other end of the body 11 is a cover 15 which is secured to the body by screws 16.

Located within the body 11 is a gear set 20 having a ring gear 21 and a spur gear 22 substantially identical to the gears of the pump of the aforementioned Hunsberger et al patent, the gear being fixed to and rotatable with the free or inner end portion of the drive shaft 13. The ring gear is surrounded by a stationary spacer 23 which is sandwiched between a port plate 24A and an end plate 24B. Screws 29 secure the spacer 23, the port plate 24A and the end plate 24B to the body 11. When the shaft 13 is driven, the gear 22 of the gear set 20 is rotated and coacts with the ring gear 21 of the gear set to pressurize the fuel and to supply the pressurized fuel to the outlet of the pump 10.

In order to fix the spur gear 22 for rotation with the shaft 13, a key 25 fits in a keyway 26 formed in the shaft and in a keyway 27 formed in the wall of a hole or bore 28 which extends through the spur gear and which receives the shaft. The keyway 26 of the shaft opens radially of the shaft and also opens axially out of the inner end of the shaft. The keyway 27 in the spur gear opens radially and also opens axially out of both ends of the gear. In this instance, the key 25 is simply a rectangular block of metal which is received by the keyways with a slidable fit in an axial direction but with a tight fit in an angular direction.

To prevent oil from leaking along the shaft 13 and out of the body 11, a seal 29 is telescoped into the body and over the shaft and is located adjacent the inboard end of the bearing 14. In the present instance, the seal is a so-called lip seal. Such a seal is very effective in preventing leakage of oil along the shaft but is not capable of preventing axial movement of the shaft within the body. A gear pump with a so-called face seal is disclosed in Harwath U.S. Pat. No. 4,171,939. While a face seal is effective to prevent the shaft from moving axially within the body, a lip seal is preferred in some applications.

The present invention contemplates the provision of new and relatively simple means for fastening the shaft 13 rigidly against axial movement relative to the body 11 while permitting use of the conventional key 25. As a result, the pump 10 may be equipped with the lip seal 29 and yet, as will become apparent subsequently, only a very small modification need be made to the pump in order to lock the shaft 13 against axial movement within the body 11.

Herein, the shaft retaining means comprise a generally circular ring 30 (FIG. 5) made of spring tempered wire having a circular cross-section. While the ring 30 is generally circular, it is split radially and thus includes two opposing ends 31 which define the ends of a radially extending slot 32. The transverse width of the slot is somewhat greater than the transverse width of the key 25.

Circumferentially extending grooves 35 and 36 are formed in the outer surface of the shaft 13 and in the wall of the bore 28 of the spur gear 22 and coact with the ring 30. The grooves are circular in cross-section and are alined axially with one another when the shaft 13 is fully assembled with the gear 22 as shown in FIG. 2.

In carrying out the invention, the depth of the groove 35 in the shaft 13 is greater than the cross-sectional diameter of the round wire from which the ring 30 is made. Stated differently, the root diameter of the groove 35 is less than the inner diameter of the ring 30. As a result, the ring may be placed in the groove 35 and contracted hoopwise through a sufficient distance that the outer periphery of the ring either is coincident with or lies inwardly of the outer periphery of the shaft 13.

Further in keeping with the invention, the depth of the groove 36 in the gear 22 is less than the cross-sectional diameter of the round wire of the ring 30, and the root diameter of the groove 36 is smaller than the outer diameter of the ring when the ring is fully expanded in a hoopwise direction. By virtue thereof, the inner periphery of the ring projects radially inwardly from the wall of the bore 28 in the gear 22.

With the foregoing arrangement, the shaft 13 may be assembled with the gear 22 by placing the ring 30 in the groove 35 in the shaft and by placing the key 25 in the keyway 27 of the gear. The shaft 13 with the ring 30 in place then is inserted into the conical bore 40 of an installation tool 41 (FIG. 4), and the gear 22 with the key 25 in place is inserted into a counterbore 43 formed in one end portion of the tool. The shaft is oriented angularly in such a position that the keyway 26 in the shaft is alined angularly with the key 25. In addition, the ring 30 is oriented angularly such that the slot 32 in the ring is oriented angularly with the key 25 and the keyway 27.

With the shaft 13, the gear 22, the key 25 and the ring 30 positioned as described above, the exposed end of the gear is backed firmly by a fixture (not shown). The shaft then is moved endwise in the tool 41 and toward the gear. During such movement, the conical bore 40 in the tool contracts the ring 30 hoopwise into the groove 35 in the shaft and causes the ring to contract to a position in which the outer periphery of the ring is located just inwardly of the outer periphery of the shaft. The slot 32 in the ring is sufficiently wide that the ends 31 of the ring do not clamp against the sides of the key 25 when the ring is fully contracted by the bore 40 of the tool 41.

The minimum diameter of the conical bore 40 in the tool 41 is no greater than the diameter of the bore 28 in the gear 22. As a result, the bore 40 keeps the ring 30 contracted and allows the ring to move into the bore 28 in the gear as the shaft 13 telescopes into the gear. During such telescoping, the keyway 26 in the shaft starts receiving the key 25.

When the shaft 13 has telescoped sufficiently far into the gear 22 that the ring 30 is in axial alinement with the groove 36, the contracted ring 30 automatically expands hoopwise and snaps into the groove 36. When the ring is fully expanded, its outer periphery is located in the groove 36 while its inner periphery is located in the groove 35. Thus, the ring acts to hold the shaft and the gear in axially assembled relation. After such assembly has been achieved, the installation tool 41 is pulled off of the shaft.

From the foregoing, it will be apparent that the present invention brings to the art a new and improved gear pump 10 in which the ring 30 coacts with the grooves 35 and 36 to hold the shaft 13 and the gear 22 in tightly assembled relation. By virtue of the slot 32 in the ring accommodating the key 25, the shaft and the gear may be coupled rotationally by the conventional key/slot connection which has been illustrated.

Advantageously, at least one side wall of one of the grooves 35, 36 is inclined so as to facilitate disassembly of the shaft 13 and the gear 22 in the event that one of those components requires replacement. In this instance, the inboard wall of the groove 36 in the gear 22 is inclined at an angle of about 40 degrees relative to a plane which contains the axis of the gear. To disassemble the shaft and the gear, the inboard end of the gear is supported rigidly and then the shaft is driven from right to left as viewed in FIG. 4. As an incident thereto, the inclined side wall of the groove 36 contracts the ring 30 hoopwise to a sufficient degree to allow the ring to escape from the groove 36 and to move fully into the groove 35. This allows the shaft to move from right to left through the bore 28 in the gear and out of assembled relation with the gear.

I claim:

1. A gear pump comprising a body, an elongated cylindrical shaft rotatably supported by said body and having an axially facing free end, a spur gear having a cylindrical hole receiving the free end portion of said shaft, radially opening keyways located in the free end portion of said shaft and in the wall of said hole, at least one of said keyways also opening axially, a key located in said keyways and preventing relative rotation between said shaft and said gear, and means for preventing relative axial movement between said shaft and said gear, said means comprising a first groove extending circumferentially around at least a portion of said shaft, a second groove extending circumferentially around at least a portion of the wall of said hole and alined axially with the groove in said shaft, and a ring-like retainer made of resiliently yieldable material, said retainer having an inner peripheral portion located in the groove in said shaft and having an outer peripheral portion located in the groove in the wall of said hole, said retainer being made of round wire having a predetermined cross-sectional diameter, the depth of the groove in said shaft being at least as great as the cross-sectional diameter of said wire whereby the retainer may be contracted resiliently and hoopwise into the groove in the shaft without the outer peripheral portion of the retainer projecting radially beyond the cylindrical surface of the shaft, the effective depth of the groove in the wall of said hole being less than the cross-sectional diameter of said wire whereby the latter groove captivates the inner peripheral portion of said retainer in the groove in said shaft when the retainer is expanded hoopwise, said retainer being radially split and having circumferentially facing ends which straddle said key, the transverse distance between the ends of said retainer being just slightly greater than the transverse width of said key when said retainer is fully contracted into the groove in said shaft.

2. A gear pump as defined in claim 1 in which one of said grooves includes opposing side walls, one of said side walls being inclined at an acute angle relative to a plane extending perpendicular to the axis of said shaft to facilitate disassembly of said gear from said shaft.

3. A gear pump as defined in claim 2 in which the groove with the inclined side wall is the groove in the wall of said hole.

4. A gear pump as defined in claim 3 in which the inclined side wall of the groove in the wall of said hole is located between the free end of the shaft and the other side wall of such groove.

* * * * *